(12) United States Patent
Tamatsu et al.

(10) Patent No.: US 6,198,426 B1
(45) Date of Patent: Mar. 6, 2001

(54) METHOD AND APPARATUS FOR DETECTING ROAD CIRCUMSTANCES AROUND A TRAVELING VEHICLE AND A RECORDING MEDIUM FOR STORING A RELATED SOFTWARE PROGRAM

(75) Inventors: Yukimasa Tamatsu, Okazaki; Hiroaki Kumon, Kariya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/390,680

(22) Filed: Sep. 7, 1999

(30) Foreign Application Priority Data

| Sep. 7, 1998 | (JP) | ................................................ 10-252905 |
| Jul. 14, 1999 | (JP) | ................................................ 11-200467 |

(51) Int. Cl.[7] .................................................. G01S 13/93
(52) U.S. Cl. ................................ 342/70; 342/71; 342/72; 342/114; 342/115
(58) Field of Search ................................. 342/70, 71, 72, 342/104, 106, 107, 109, 113, 114, 115, 118, 119, 125, 147, 195, 196

(56) References Cited

U.S. PATENT DOCUMENTS

| 4,527,894 | * | 7/1985 | Goede et al. ............................ 356/28 |
| 5,461,357 | | 10/1995 | Yoshioka et al. ...................... 340/435 |
| 5,563,602 | * | 10/1996 | Stove ....................................... 342/70 |
| 5,619,208 | | 4/1997 | Tamatsu et al. ........................ 342/70 |
| 5,731,778 | | 3/1998 | Nakatani et al. ....................... 342/70 |
| 5,757,307 | | 5/1998 | Nakatani et al. ....................... 342/70 |
| 5,815,112 | | 9/1998 | Sasaki et al. ........................... 342/70 |
| 6,044,321 | * | 3/2000 | Nakamura et al. ..................... 701/96 |

FOREIGN PATENT DOCUMENTS

| 5-205198 | 8/1993 | (JP) . |
| 6-195600 | 7/1994 | (JP) . |
| 2000111640 | * 4/2000 | (JP) ............................... G01S/13/34 |

OTHER PUBLICATIONS

"Research and Development Report of Automotive Vehicle Radar", Jul. 1993, pp. 52–83 and 95–98.

* cited by examiner

Primary Examiner—John B. Sotomayor
(74) Attorney, Agent, or Firm—Pillsbury Madison & Sutro LLP

(57) ABSTRACT

The present position of a previously recognized stationary object group (SOp) is estimated based on past position data and the movement of the traveling vehicle during a past time ($\Delta T$). A clearance (Mwr, Mwl) between a traveling vehicle (Mx) and an adjacent stationary object group (Mxr, Mxl) is obtained based on the estimated position data. A clearance (Twr, Twl) between a preceding vehicle (Tx) and an adjacent stationary object group (Txr, Txl) is obtained based on the estimated position data and the position data of the preceding vehicle. A same lane judgement is performed to judge whether the traveling vehicle (VM) and the preceding vehicle (VT) are traveling on a same traffic lane based on at least one of the detected clearances (Mwr, Mwl, Twr, Twl).

36 Claims, 9 Drawing Sheets

METHOD AND APPARATUS FOR DETECTING ROAD CIRCUMSTANCES AROUND A TRAVELING VEHICLE AND A RECORDING MEDIUM FOR STORING A RELATED SOFTWARE PROGRAM

BACKGROUND OF THE INVENTION

The present invention relates to a method and an apparatus for detecting road circumstances around a traveling vehicle and a recording medium for storing a related software program. The present invention is applicable to a vehicle follow-up system or a distance warning system based on a radar system.

In a conventional vehicle follow-up control, a same lane judgement is performed to check whether the preceding vehicle is traveling on the same traffic lane as that of a traveling vehicle mounting a radar system (hereinafter referred to as system's vehicle).

For example, it is possible to use information obtainable from the steering sensor and the yaw rate sensor in judging whether the traffic lane is a straight lane or a curved lane. An estimated road shape or configuration will be obtained from this judgement. The same lane judgement is performed based on such an estimated road by checking whether the preceding vehicle and the system's vehicle exist on the same traffic lane of this estimated road.

However, the curvature of a traveling road changes flexibly or randomly. A straight road may suddenly change to a curved road or vice versa. In such a case, it is difficult to accurately obtain the estimated road. This leads to an error in the same lane judgement. In other words, the information obtainable from the steering sensor and the yaw rate sensor is limited to present conditions of the system's vehicle and therefore cannot predict the future behavior of the system's vehicle.

To solve such a problem, Unexamined Japanese Patent Publication No. 6-195600 discloses a laser radar system and proposes a method of estimating the road configuration based on the positional relationship between the traveling vehicle and reflectors provided along a road edge.

However, this conventional system has the following problems:

① There are many roads along which no reflectors are provided. Thus, the usability of the above conventional system is limited to specific or high-grade roads.

② In general, many of highway roads are designed to have a clothoid curve whose curvature changes continuously or momentarily. Thus, an error will be caused if the same lane judgement is made based on only one curvature value.

③ Furthermore, the laser-based radar technology cannot be simply applied to a radio wave type radar due to difference in their resolutions. In general, the radio wave type radar is inferior to the laser type radar in azimuth detecting capability. The level of reflected radar wave varies greatly depending on the angle between the emitted radar wave and a target object. Furthermore, the radio wave type radar is subjected to a multipath phenomenon caused by multiple reflections of radio wave.

SUMMARY OF THE INVENTION

In view of the foregoing problems in the prior art, the present invention has an object to provide a method and an apparatus for accurately detecting road circumstances around a traveling vehicle and a recording medium for storing a related software program.

In order to accomplish this and other related objects, the present invention provides a first road circumstance detecting apparatus comprising a radar system mounted on a traveling vehicle for emitting radar wave toward a presently measurable stationary object group existing in front of the radar system and for measuring the momentary position of the presently measurable stationary object group based on reflection of the radar wave. A memory means is provided for storing measured position data of the presently measurable stationary object group existing in front of the radar system. An estimating means is provided for estimating the present position of a previously recognized stationary object group based on the measured position data of the previously recognized stationary object group stored in the memory means and the movement of the traveling vehicle during a past time. And, a detecting means is provided for detecting a clearance between the traveling vehicle and a stationary object group positioned adjacent to the traveling vehicle along a road edge based on the present position data of the previously recognized stationary object group estimated by the estimating means.

Preferably, the clearance detection is performed by using the present position data of a previously recognized stationary object group existing within a predetermined region with respect to the traveling vehicle.

In this case, the predetermined region has a longitudinal size longer than a longitudinal length of the traveling vehicle. The longitudinal size of the predetermined region is substantially equal to two times the longitudinal length of the traveling vehicle.

Preferably, the stationary object group positioned adjacent to the traveling vehicle along the road edge is separated into right and left groups to detect a clearance between the traveling vehicle and each of the right and left groups.

Furthermore, the present invention provides a second road circumstance detecting apparatus comprising a radar system mounted on a traveling vehicle for emitting radar wave toward a presently measurable stationary object group existing in front of the radar system and for measuring the momentary position of the presently measurable stationary object group based on reflection of the radar wave. The second road circumstance detecting apparatus comprises a memory means for storing measured position data of the presently measurable stationary object group existing in front of the radar system, an estimating means for estimating the present position of a previously recognized stationary object group based on the measured position data of the previously recognized stationary object group stored in the memory means and the movement of the traveling vehicle during a past time, and a detecting means for detecting a clearance between a preceding vehicle and a stationary object group positioned adjacent to the preceding vehicle along a road edge based on the present position data of the previously recognized stationary object group estimated by the estimating means and position data of the preceding vehicle.

Preferably, a first selecting means is provided for selecting a previously recognized stationary object group existing within a predetermined region with respect to the preceding vehicle, and the clearance detection is performed by using the present position data of the previously recognized stationary object group selected by the first selecting means.

In this case, the predetermined region has a longitudinal size longer than a longitudinal length of the preceding vehicle. The longitudinal size of the predetermined region is substantially equal to two times the longitudinal length of the preceding vehicle.

Preferably, a second selecting means is provided for selecting a presently measurable stationary object group existing within a predetermined region with respect to the preceding vehicle, and the clearance detection is performed by using the position data of the presently measurable stationary object group selected by the second selecting means.

And, the stationary object group positioned adjacent to the preceding vehicle along the road edge is separated into right and left groups to detect a clearance between the preceding vehicle and each of the right and left groups.

It is also preferably that an estimated traffic lane of a traveling road is corrected based on the clearance obtained by the detecting means.

The present invention provides a third road circumstance detecting apparatus including all of characteristic features of the above-described first and second road circumstance detecting apparatus. The third road circumstance detecting apparatus further comprises a same lane judging means for judging whether the traveling vehicle and the preceding vehicle are traveling on a same traffic lane based on at least one of the detected clearances detected by the first detecting means and the second detecting means.

In this same lane judgement, the clearance between the traveling vehicle and the stationary object group positioned adjacent to the traveling vehicle is compared with the clearance between the preceding vehicle and the stationary object group positioned adjacent to the preceding vehicle. And, it is recognized that the preceding vehicle and the traveling vehicle are traveling on the same traffic lane when a difference between the compared clearances is smaller than a predetermined value.

The radar system used in this invention may be a FMCW (frequency modulated continuous wave) type radar system comprising a transmitting means for transmitting a radar wave carrying a transmission signal having a periodically increasing and decreasing frequency with a predetermined modulation width. A receiving means is provided for receiving a radar wave reflected from a target object to generate a reception signal. The reception signal is mixed with the transmission signal to generate a beat signal. A spectrum producing means is provided for producing an ascending spectrum from an ascending beat signal obtained during an ascending modulation where the frequency of the transmission signal increases and also for producing a descending spectrum from a descending beat signal obtained during a descending modulation where the frequency of the transmission signal decreases. And, a detecting means is provided for shifting a peak of at least one of the ascending spectrum and the descending spectrum by a predetermined frequency shift amount to compare corresponding peaks of the ascending spectrum and the descending spectrum, thereby detecting a shift condition of the target object.

The FMCW type radar system further comprises a frequency shift amount determining means for setting a plurality of frequency shift amounts based on a traveling speed of the traveling vehicle. An evaluation means is provided for evaluating a spectrum matching degree for each of the ascending spectrum and the descending spectrum corresponding to each of the frequency shift amounts. An identifying means is provided for identifying an optimum frequency shift amount having the highest degree in spectrum matching. And, a stationary object judging means is provided for judging whether the target object is a stationary object based on the ascending spectrum and the descending spectrum of the optimum frequency shift amount.

Another aspect of the present invention provides a method for detecting road circumferences around a traveling vehicle performed by the above-described road circumstance detecting apparatuses.

Another aspect of the present invention provides a recording medium storing a software program installable in a computer system for detecting road circumstances in accordance with the present invention.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENT

Figure 1:
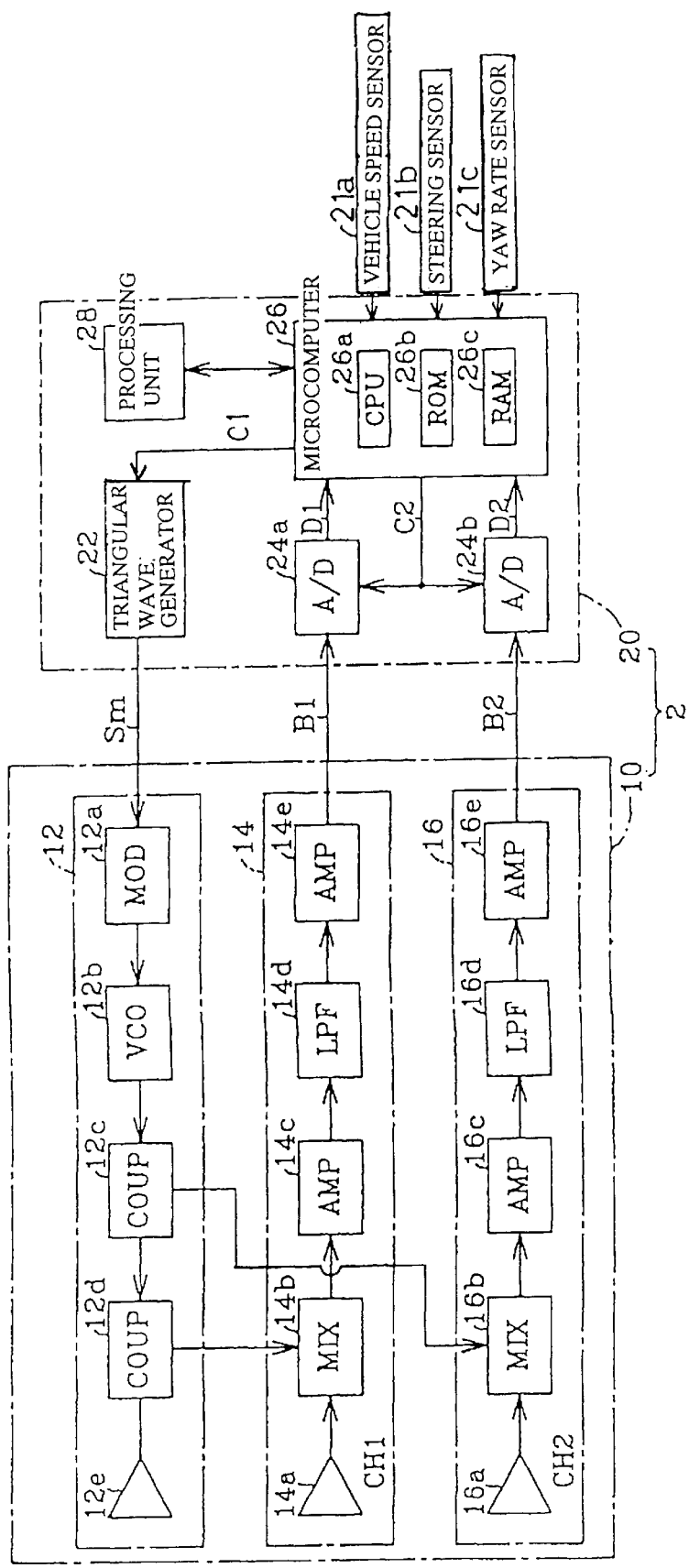
FIG. 1 is a schematic block diagram showing an overall arrangement of a radar system in accordance with a preferred embodiment of the present invention.

A preferred embodiment of the present invention will be explained in greater detail hereinafter with reference to the accompanying drawings. Identical parts are denoted by the same reference numerals throughout the views.

Overall System Arrangement

FIG. 1 is a schematic block diagram showing an overall arrangement of a FMCW (i.e., frequency modulated continuous wave) radar system in accordance with a preferred embodiment of the present invention. The FMCW radar system is a phase difference type mono-pulse radar system, and is hereinafter simply referred to as radar.

As shown in FIG. 1, a radar system 2 of the preferred embodiment consists of a transmitter-receiver section 10 and a signal processing section 20. The transmitter-receiver section 10 comprises a transmitter 12 sending out or emitting radar wave having a predetermined frequency modulated in accordance with a modulation signal Sm, and a pair of receivers 14 and 16 receiving radar wave emitted from transmitter 12 and reflected from a target obstacle. The signal processing section 20 supplies the modulation signal Sm to the transmitter 12, and performs the processing for detecting the obstacle target and also judging road circumstances based on intermediate-frequency beat signals B1 and B2 generated from receivers 14 and 16.

According to this preferred embodiment, the radar system is installed in an automotive vehicle to detect a target obstacle existing in front of the automotive vehicle. The transmitter-receiver section 10 is placed at the front side of a vehicle body, while the signal processing section 20 is located at a predetermined position in or near a passenger compartment.

The signal processing section 20, constituted by a microcomputer, receives various sensor signals, such as a vehicle speed signal obtained from a vehicle speed sensor 21a, a steering angle signal obtained from a steering sensor 21b, and a yaw rate signal obtained from a yaw rate sensor 21c.

The transmitter 12 comprises a modulator (MOD) 12a, a voltage-controlled oscillator (VCO) 12b, power distributors (COUP) 12c and 12d, and a transmitter antenna 12e. The modulator (MOD) 12a converts the modulation signal Sm to a signal having an adjustment level for the voltage-controlled oscillator 12b and sends the modulated signal to the voltage-controlled oscillator 12b. The voltage-controlled oscillator (VCO) 12b generates a high-frequency signal of milliwave band as a transmission signal. The power distributors 12c and 12d generate local signals to be supplied to the receivers 14 and 16 by power distributing the transmission signal generated from the voltage-controlled oscillator 12b. And, the transmitter antenna 12e emits radar wave in accordance with the transmission signal.

The receiver 14 comprises a receiver antenna 14a, a mixer 14b, a preamplifier 14c, a low-pass filter 14d, and a postamplifier 14e. The receiver antenna 14a receives radar wave. The mixer 14b mixes the reception signal received by the receiving antenna 14a with the local signal supplied from the power distributor 12d. The preamplifier 14c amplifies an output of mixer 14b. The low-pass filter 14d removes unnecessary high-frequency components from the output of preamplifier 14c and extracts or produces a beat signal B1 representing a frequency difference component between the transmission signal and the reception signal. And, the postamplifier 14e amplifies the magnitude of beat signal B1 to a required level.

Similarly, receiver 16 comprises a receiver antenna 16a, a mixer 16b, preamplifier 16c, and a postamplifier 16e. The receiver antenna 16a receives radar wave. The mixer 16b mixes the reception signal received by the receiving antenna 16a with the local signal supplied from power distributor 12c. The preamplifier 16c amplifies an output of mixer 16b. The low-pass filter 16d removes unnecessary high-frequency components from the output of preamplifier 16c and extracts or produces a beat signal B2 representing a frequency difference component between the transmission signal and the reception signal. And, the postamplifier 16e amplifies the magnitude of beat signal B2 to a required level. The receiver 14 is assigned to a receiver channel CH1, while the receiver 16 is assigned to a receiver channel CH2.

On the other hand, the signal processing section 20 comprises a triangular wave generator 22, A/D converters 24a and 24b, a microcomputer 26, and a processing unit 28. The triangular wave generator 22 generates the modulation signal Sm of a triangular waveform in response to an activation signal C1. The A/D converters 24a and 24b receive the beat signals B1 and B2 supplied from the receivers 14 and 16 and convert them into digital data D1 and D2 in response to an activation signal C2. The microcomputer 26, chiefly consisting of CPU 26a, ROM 26b and RAM 26c, sends out the activation signals C1 and C2 to operate the triangular wave generator 22 and the A/D converters 24a, 24b. Furthermore, microcomputer 26 performs target obstacle detecting processing (later described) for detecting the distance, relative velocity and azimuth of a target obstacle with respect to a system's vehicle (i.e., an automotive vehicle equipped with the radar system) based on digital data D1 and D2 obtained through A/D converters 24a and 24b. The processing unit 28 performs the calculation for fast Fourier transformation (FFT) based on the command given from microcomputer 26.

The A/D converters 24a and 24b start their operations in response to the activation signal C2, and convert the analog beat signals B1 and B2 into digital data D1 and D2 at predetermined time intervals, and write these digital data to a predetermined region of RAM 26c. When a predetermined number of A/D conversions are entirely finished, A/D converters 24a and 24b set a termination flag (not shown) on RAM 26c and stop their operations.

When the triangular wave generator 22 is activated in response to the activation signal C1, the modulation signal Sm is entered through modulator 12a into the voltage-controlled oscillator 12b. The voltage-controlled oscillator 12b generates the transmission signal modulated in response to modulation signal Sm. More specifically, the frequency of the transmission signal increases in proportion to the ascending gradient of the triangular waveform of modulation signal Sm (this section is referred to as "ascending section"), while the frequency of the transmission signal decreases in proportion to the descending gradient of the triangular waveform of modulation signal Sm (this section is referred to as "descending section").

Figure 2:
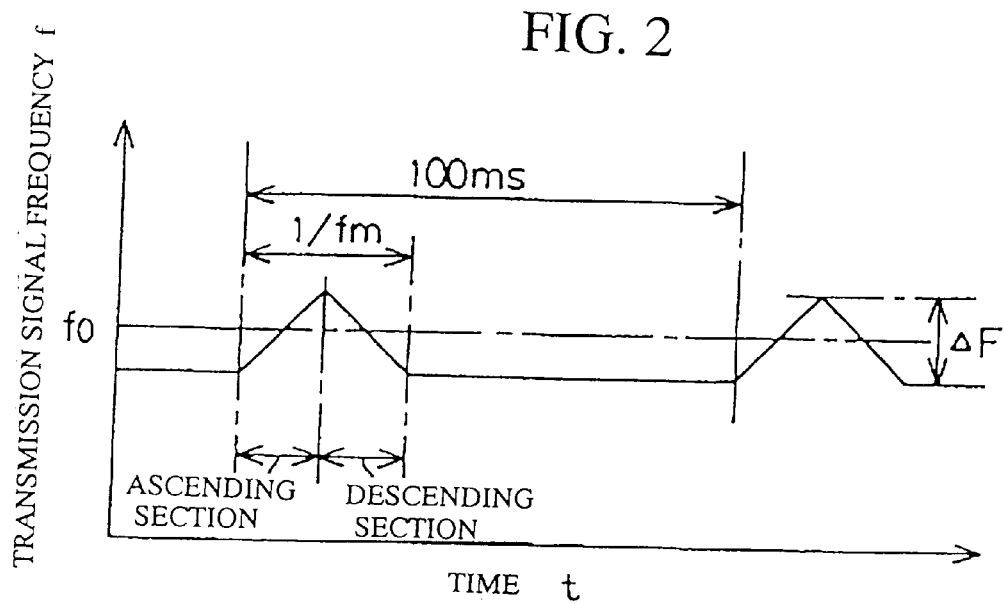
FIG. 2 is a waveform view showing frequency change of a transmission signal in accordance with the preferred embodiment of present invention.

FIG. 2 is a view showing the modulation of the transmission signal. As shown in FIG. 2, the modulation is performed in such a manner that frequency of the transmission signal increases and decreases by an amount $\Delta F$ during a time interval of $1/fm$ in response to the modulation signal Sm. The central frequency during this frequency variation is f0. In FIG. 2, a time interval of 100 ms is a period (time interval for one cycle) of the later-described target obstacle detecting processing. The activation signal C1 is generated during the target obstacle detecting processing.

The transmitter 12 generates radar wave in accordance with this transmission signal. The radar wave, after it is reflected from a target obstacle, returns to the radar system 2 and is received by the receivers 14 and 16. The receivers 14 and 16 mix the reception signals obtained from antennas 14a and 16a with the transmission signal obtained from transmitter 12, thereby producing beat signals B1 and B2. In this case, the reception signal is delayed with respect to the transmission signal by a time required for the radar wave going from radar system 2 to the target obstacle and returning from the target obstacle to radar system 2. Furthermore, if there is any speed difference between radar system 2 and the target obstacle, the reception signal will be subjected to a Doppler shift. In such a case, the beat signals B1 and B2 comprise a delay component fr and a Doppler component.

Figure 3:
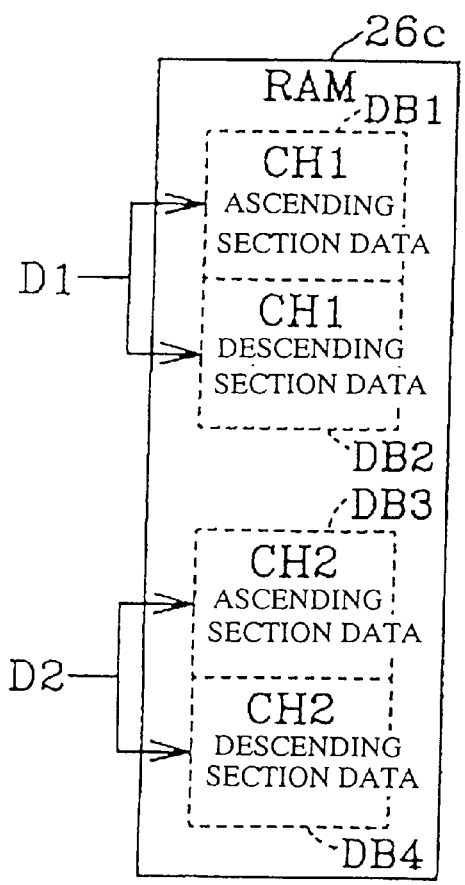
FIG. 3 is view illustrating data stored in RAM in accordance with the first embodiment of present invention.

As shown in FIG. 3, digital data D1, successively produced from A/D converter 24a through A/D conversion of beat signal B1, are stored in data blocks DB1 and DB2 of RAM 26c. In the same manner, digital data D2, successively produced from A/D converter 24b through A/D conversion of beat signal B2, are stored in data blocks DB3 and DB4 of RAM 26c.

The A/D converters 24a and 24b start their operations in synchronism with the activation of triangular wave generator 22 and perform a predetermined number of A/D conversions during a period of time corresponding to the generation of modulation signal Sm. Hence, data blocks DB1 and DB3 storing the first half of the data, store the ascending-section data corresponding to the ascending section of the transmission signal. Data blocks DB2 and DB4 storing the second half of the data, store the descending-section data corresponding to the descending section of the transmission signal.

The data stored in each of data blocks DB1 through DB4 is processed by microcomputer 26 and processing unit 28 to detect the target obstacle and road circumstances (i.e., stationary objects disposed on or in the vicinity of the traveling road).

Obstacle Detecting Processing

Next, the target obstacle detecting processing executed by CPU 26a of microcomputer 26 will be explained with reference to the flowchart of FIG. 4. As described previously, the target obstacle detecting processing of this embodiment is performed every 100 ms (i.e., processing time interval=100 ms).

Figure 4:
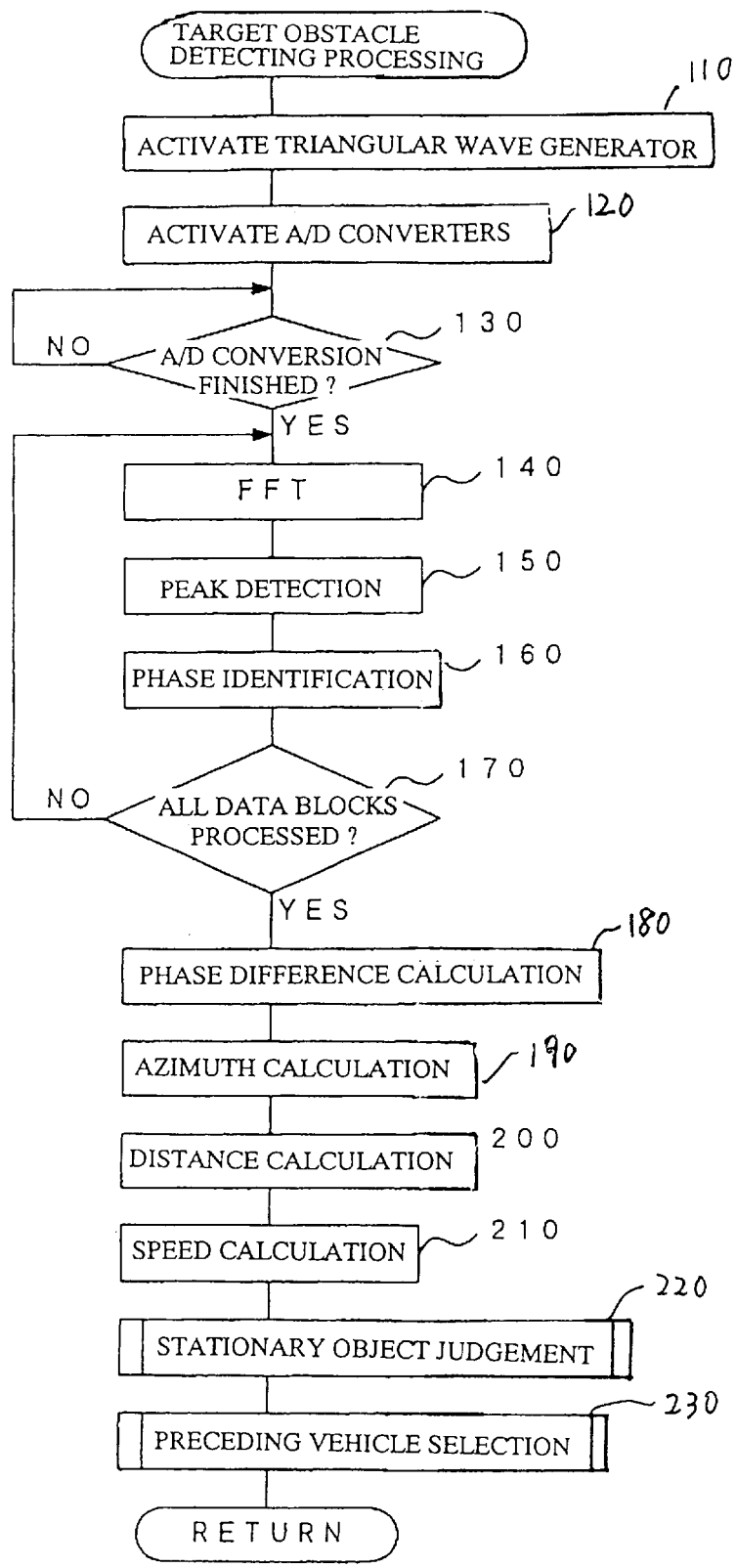
FIG. 4 is a flowchart explaining details of target obstacle detecting processing in accordance with the preferred embodiment of the present invention.

As shown in FIG. 4, after starting the target obstacle detecting processing, the activation signal C1 is generated in step 110 to activate the triangular wave generator 22. Then, in step 120, the termination flag on RAM 26c is cleared and the activation signal C2 is generated to activate the A/D converters 24a and 24b.

Through this procedure, the triangular wave generator 22 produces the modulation signal Sm. The transmitter 12, when it receives the modulation signal Sm, transmits the radar wave having the modulated frequency. The receivers 14 and 16 receive the radar wave reflected from the target obstacle, and generate the beat signals B1 and B2. The A/D converters 24a and 24b convert the beat signals B1 and B2 into the digital data D1 and D2. The digital data D1 and D2 are written into RAM 26c.

In the succeeding step 130, the termination flag on RAM 26c is checked to make a judgement as to whether or not all of the A/D conversions is entirely finished. When the termination flag is not set (i.e., when all of the A/D conversions is not completed yet), step 130 is repetitively executed. When the termination flag is set (i.e., when all of the A/D conversions is entirely finished), the control flow proceeds to step 140.

In step 140, data blocks DB1 to DB4 on RAM 26c are successively selected and the data of each data block DBi (i=1 to 4) are entered into processing unit 28 to execute the fast Fourier transformation (i.e., FFT). The data entered in processing unit 28 are subjected to the conventional window processing using a Hanning window or a triangular window or the like to suppress the side lobe appearing in the calculation for the fast Fourier transformation. The frequency spectrum data obtained through this FFT calculation are complex vectors in relation to frequency.

In step 150, a peak of each frequency spectrum is detected based on the absolute value of the complex vector, i.e., an amplitude of the frequency component shown by the complex vector. The frequency corresponding to the detected peak is specified as a peak frequency. Regarding the method for detecting the peak, it will be possible to successively obtain the momentary variation of the amplitude with respect to the frequency and find out a specific frequency The sign of the momentary variation is inverted before and after this specific frequency.

In step 160, the phase of the peak frequency component specified in step 150 is calculated. This phase is identical with the angle formed between the complex vector and the real axis. Therefore, the phase of the peak frequency component can be simply obtained from the complex vector.

In the next step 170, it is checked whether there is any data block DBi not yet processed. When there is any unprocessed data block DBi (i.e., NO in step 170), the control flow returns to step 140 and executes the processing of steps 140 to 160 with respect to the unprocessed data block DBi. On the other hand, when all of the data blocks are thoroughly processed (i.e., YES in step 170), the control flow proceeds to step 180.

Executing the above-described steps 140 through 170 obtains, as a result, beat frequencies $f_{11}$ and $f_{12}$ at the ascending and descending sections of the beat signal B1 (i.e., receiver channel CH1), as well as beat frequencies $f_{21}$ and $f_{22}$ at the ascending and descending sections of the beat signal B2 (i.e., receiver channel CH2). Furthermore, phases $\Phi_{11}$, $\Phi_{12}$, $\Phi_{21}$, and $\Phi_{22}$ are obtained as corresponding to these frequencies $f_{11}$, $f_{12}$, $f_{21}$, and $f_{22}$, respectively.

The next step 180 obtains a phase difference $\Delta\Phi j$ (j=1, 2) between the beat frequency components of receiver channels CH1 and CH2 in each of the ascending and descending sections by using the following equation (1).

$$\Delta\Phi j=\Phi 1j-\Phi 2j \tag{1}$$

The next step 190 selects either of phase differences $\Delta\Phi 1$ and $\Delta\Phi 2$ calculated in step 180 as a phase difference $\Delta\Phi$ for the following azimuth calculation. An azimuth $\theta$ of the target obstacle is calculated based on the selected phase difference $\Delta\Phi$ by using the following equation (2).

$$\theta=\Delta\Phi\cdot\lambda/(2\pi\cdot D) \tag{2}$$

where $\lambda$ represents the wavelength of the reflected radar wave and D represents the distance between the radar system 2 and the target obstacle.

The next step 200 calculates the distance D between the radar system 2 and the target obstacle based on the beat frequencies fb1 and fb2 of the ascending and descending sections in each receiver channel CHi (i=1, 2) by using the following equation (3).

$$D=\{C/(8\cdot\Delta F\cdot fm)\}\cdot(fb1+fb2) \tag{3}$$

where $\Delta F$ represents a frequency deviation width of the transmission signal, 1/fm represents a period of time required for completing the modulation of one cycle, fb1 represents the beat frequency of the ascending section (i.e., ascending beat frequency), fb2 represents the beat frequency of the descending section (i.e., descending beat frequency), and C represents the speed of light.

The next step 210 calculates the relative velocity V between the radar system 2 and the target obstacle based on the beat frequencies fb1 and fb2 of the ascending and descending sections in each receiver channel CHi (i=1, 2) by using the following equation (4).

$$V=\{C/(4\cdot f0)\}\cdot(fb2-fb1) \tag{4}$$

where f0 represents the central frequency of the transmission signal.

A set of distance D and relative speed V is obtained independently from each of receiver channels CH1 and CH2. An appropriate one of two sets having been thus obtained is selected as a final set of distance D and relative speed V.

The next step 220 performs stationary object judging processing in which a judgement is made as to whether the target object is a stationary object.

Subsequently, step 230 performs preceding vehicle selecting processing. More specifically, a same lane judgement is performed to check whether a preceding vehicle is traveling on the same traffic lane. Then, a true or closest preceding vehicle traveling on the same traffic lane is selected. Then, this routine is completed.

Stationary Object Judgement (Fundamental Principle)

Hereinafter, a fundamental principle of the stationary object judging processing performed in step 220 is simply explained.

(I) First, the frequency shift amount is calculated through the following three procedures.

① By using the vehicle speed VB of the system's vehicle, an equation (5) is introduced for obtaining a fundamental frequency shift amount (i.e., fundamental shift amount).

$$\text{Fundamental shift amount} = (fb2-fb1) = (4 \cdot VB \cdot f0)/C \quad (5)$$

where fb1 represents the ascending beat frequency, fb2 represents the descending beat frequency, VB represents the vehicle speed of the system's vehicle, f0 represents the central frequency of the transmission signal, and C represents the speed of light.

② Next, the following correction is performed considering a beam angle θ of the radar wave transmitted from the transmitter 12. Namely, as a first correction, an equation (6) is used for correcting the fundamental shift amount in accordance with the angular correction coefficient (COS θ).

$$\text{First corrected shift amount} = (4 \cdot COS\,\theta \cdot VB \cdot f0)/C \quad (6)$$

③ Next, the following correction is performed considering a delay time in the response of vehicle speed sensor 21a. Namely, an equation (7) is used for performing a second correction.

$$\text{Second corrected shift amount} = \{4 \cdot COS\,\theta \cdot (VB \pm Dv) \cdot f0\}/C \quad (7)$$

where Dv represents a speed delay amount representing the sensor response delay.

(II) Next, an evaluation function is introduced to evaluate the finally obtained frequency shift amount. First, the frequency spectrum in the descending section is shifted by using the shift amount obtained by equation (7). Then, it is checked whether the shifted frequency spectrum agrees with the frequency spectrum in the ascending section.

① According to this embodiment, from a plurality of frequency shift amounts thus obtained, an optimum frequency shift amount is obtained by using the following evaluation function.

The evaluation function is based on the following two equations (8) and (9).

$$\text{Amplitude evaluation value} = |(\text{ascending peak level} - \text{descending peak level})/\text{ascending peak level}| \quad (8)$$

$$\text{Phase difference evaluation value} = |\text{ascending phase difference} + \text{descending phase difference}| \quad (9)$$

An evaluation value |Vp| is defined as the length of an evaluation vector Vp. The evaluation vector Vp has a Y-axis component identical with the amplitude evaluation value (equation (8)) and an X-axis component identical with the phase difference evaluation value (equation (9)).

Next, as shown in the following equation (10), the evaluation value |Vp| is obtained for not only a concerned peak frequency component but also for closely located peak frequency components, to obtain a sum of thus obtained evaluation values (Sum2).

$$\text{Sum2} = |Vp(p-n)| + |Vp(p-n+1)| + \cdots + |Vp(p)| + \cdots + |Vp(p+n)| \quad (10)$$

where p represents the number identifying the concerned peak frequency to be evaluated, and n represents the width of a near-field region (the near-field region is separated into n sections).

The evaluation value Sum2 is calculated in the vicinity of each peak frequency component for each of the ascending and descending spectrums corresponding to respective frequency shift amounts.

② Next, an overall spectrum sum (Sum1) is obtained by accumulating all of Sum2 as shown in the following equation (11).

$$\text{Sum1} = \Sigma\text{Sum2} \quad (11)$$

The frequency shift amount having the smallest Sum1 (|Vp|) is referred to as a true frequency shift amount TSn.

(III) Next, a method of discriminating a moving object from a stationary object or vice versa based on the true frequency shift amount TSn will be explained hereinafter.

The difference between the moving object and the stationary object is judged based on the degree of coincidence between the ascending and descending spectrums after the ascending spectrum is shifted by this frequency shift amount.

More specifically, when Sum2 of a certain spectrum peak is equal to or smaller than a threshold Thp, it is regarded that the ascending and descending spectrum peaks agree with each other in both peak level and beam azimuth (phase difference). In this case, the agreed spectrum peaks represent a stationary object. On the other hand, when Sum2 of a certain spectrum peak exceeds the threshold Thp, it is regarded that the spectrum peaks represent a combination of a moving object and a stationary object or noises.

(IV) Next, a composite object judgement will be explained. This judgement detects a composite object of a moving object and a stationary object.

When the spectrum peak is regarded as a moving object in a previous judgement, a position of this spectrum peak after a time Δt has passed is predictable based on its moving condition. A moving object predictive flag represents such a predicted position of the moving object. When this moving object predictive flag is set, the spectrum peak is judged to be a composite object of a moving object and a stationary object. If the concerned spectrum peak is regarded as a stationary object, such a judgement is invalidated.

Details of Stationary Object Judging Processing

The stationary object judging processing in the step 220 will be explained in more detail with reference to the flowchart of FIG. 5.

The stationary object judging processing is performed based on the above-described principle to judge whether a spectrum peak of a target obstacle recognized by the radar system 2 represents a stationary object or not.

First, step 300 obtains the corrected frequency shift amount from the equation (7) which is defined based on the above-described ① to ③ procedures.

Next, step 310 starts the frequency shifting operation from, for example, a descending spectrum corresponding to a shift width Sn−1.

Subsequently, step 320 successively obtain the evaluation value |Vp| of each peak to be evaluated based on the equations (8) and (9) in the vicinity of respective peak frequency components on the frequency-shifted spectrum obtained in step 310.

Furthermore, step 330 obtains Sum2 for each peak by summing up evaluation values |Vp| in the vicinity of this peak frequency component based on the above-described equation (10).

Next, step 340 checks whether all of intended peaks to be evaluated is completely processed. In other words, it is checked whether the calculation of Sum2 is thoroughly finished for all of the intended peaks. For example, with respect to the spectrum of shift width Sn−1, it is checked whether the calculation of Sum2 is thoroughly finished for all of the peaks.

When the judgement result is YES in step 340, the control flow proceeds to step 350. When the judgement result is NO in step 340, the control flow returns to step 320 to obtain the evaluation value |Vp| and Sum2 for an unprocessed peak in the steps 320 to 340.

The step 350 calculates Sum1 based on the equation (11).

Next, step 360 checks whether the evaluation of all shift widths is finished. For example, when there are three different frequency shift amounts Sn−1, Sn and Sn+1, it is checked whether the above-described Sum1 is obtained for each of the frequency shift amounts Sn−1, Sn and Sn+1.

When the judgement result is YES in step 360, the control flow proceeds to step 370. When the judgement result is NO in step 360, the control flow returns to step 310 to repeat the processing in the steps 310 to 360.

The step 370 compares all of the obtained Sum1 values with each other to select the smallest Sum1. The frequency shift amount corresponding to the smallest Sum1 is referred to as a true frequency shift amount TSn.

Thereafter, in step 380, with respect to the spectrum which is frequency-shifted by the true frequency shift amount TSn, it is checked whether Sum2 of a predetermined peak is equal to or smaller than the threshold Thp.

When the judgement result is YES in the step 380, the control flow proceeds to step 390. When the judgement result is NO in the step 380, the control flow proceeds to step 420.

When Sum2 of an intended peak is larger than the threshold Thp, the degree of coincidence between the ascending and descending spectrums is low. Thus, the step 420 identifies this peak as representing a moving object and sets a moving object flag. When the moving object flag is set, the target obstacle corresponding to this peak is regarded as a moving object. Then, the control flow proceeds to step 430.

On the other hand, the step 390 checks whether the moving object predictive flag is set or not at this peak position. When the judgement is YES in the step 390, the control flow proceeds to step 410. When the judgement is NO in the step 390, the control flow proceeds to step 400.

When the moving object predictive flag is set, the step 410 identifies this peak as the composite object of a stationary object and a moving object and sets a composite object flag. Then, the control flow proceeds to the step 430.

When the moving object predictive flag is not set, the step 400 identifies this peak as a stationary object and sets a stationary object flag. When the stationary object flag is set, the target obstacle corresponding to this peak is regarded as a stationary object. Then, the control flow proceeds to the step 430.

Next, step 430 checks whether all of intended peaks to be evaluated is completely processed through the steps 380 to 410. In other words, it is checked whether all of the intended peaks are identified as a moving object, a stationary object, or a composite object. When the judgement result is NO in the step 430, the control flow returns to the step 380 to identify an unprocessed peak through the steps 380 to 410. When the judgement result is YES in the step 430, this routine is terminated.

Through the above processing, it becomes possible to accurately judge whether each target object is a stationary object or not. Namely, a group of stationary objects existing in front of a traveling vehicle can be accurately recognized.

Preceding Vehicle Selection (Fundamental Principle)

Next, the principle of the preceding vehicle selecting processing and its procedure performed in the step 230 will be explained in detail.

(I) Selection of presently measurable stationary objects (near a preceding vehicle)

Figure 6:
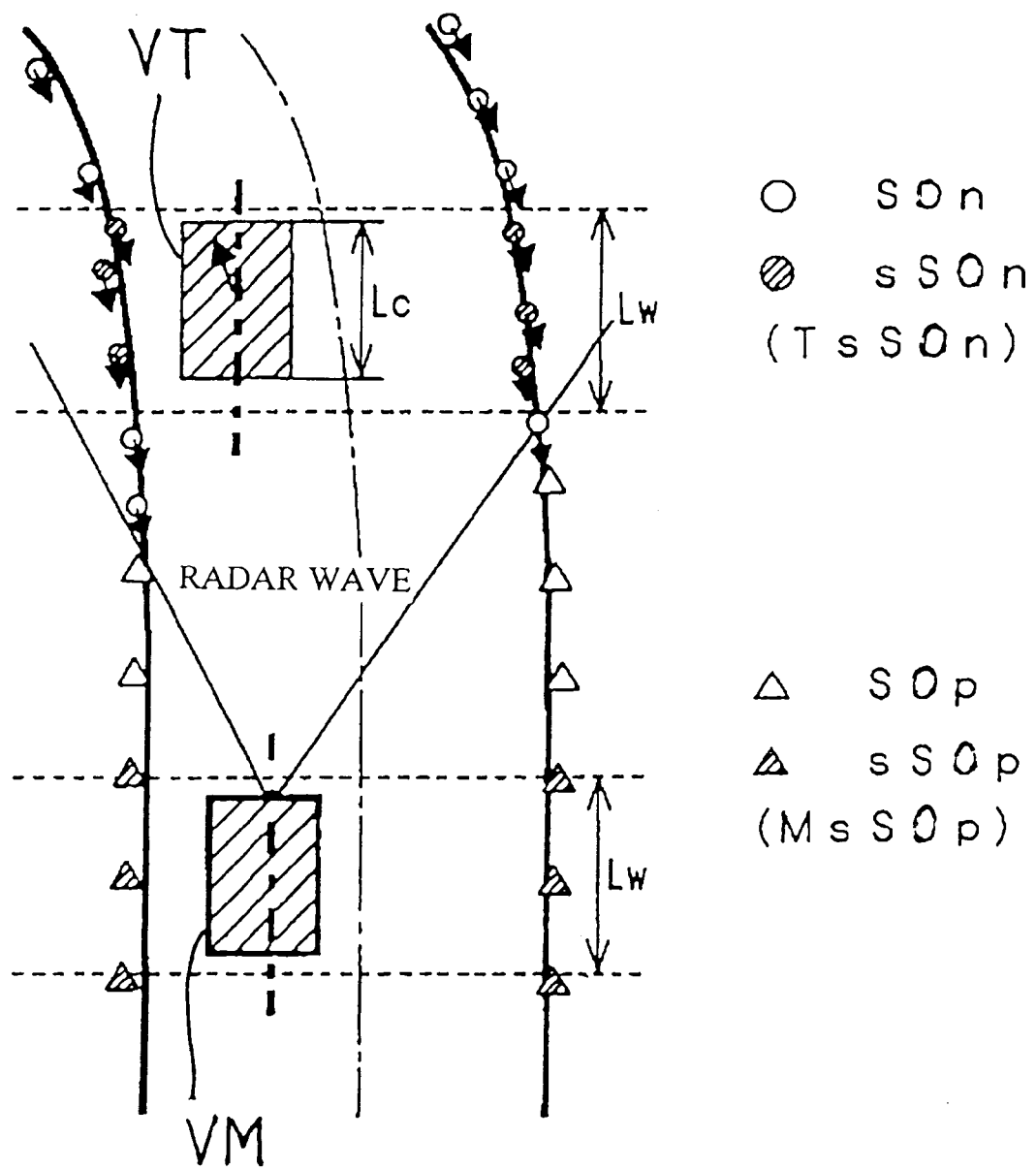
FIG. 6 is a view showing a relationship between two traveling vehicles and stationary objects located along the road edges.

FIG. 6 shows a stationary object group Son detected through the above-described stationary object judging processing. Among the stationary object group SOn, there is a stationary object group sSOn existing in the vicinity of a preceding vehicle VT traveling ahead of a system's vehicle VM by a distance Dt. The stationary object group sSOn is selected as a group of stationary objects presently positioned near the preceding vehicle VT.

More specifically, Dt is a distance from the radar system 2 of a following vehicle (i.e., system's vehicle VM) to the rear end of the preceding vehicle VT. It is assumed that Lc represents a longitudinal length of the preceding vehicle VT. Thus, the longitudinal center of the preceding vehicle VT is space by Dt+0.5 Lc from the radar system 2.

The selected stationary object group sSOn exists within a predetermined distance (±0.5 Lw) with respect to the longitudinal center of the preceding vehicle VT.

$$Dt+0.5Lc-0.5Lw<D<Dt+0.5Lc+0.5Lw$$

where D represents the position (i.e., distance from the radar system 2) of each stationary object belonging to object group sSOn.

Needless to say, no radar beam directly hits the system's vehicle VM. Therefore, all of the stationary object group sSOn are positioned in front of the system's vehicle VM.

TsSOn represents a presently measurable stationary object group existing in the vicinity of the preceding vehicle VT. MsSOp represents a previously recognized stationary object group existing in the vicinity of the system's vehicle VM.

The length Lw is longer than the length Lc (e.g., Lw=2 Lc).

All of the presently measurable stationary object group SOn is temporarily memorized as described later.

(II) Estimation of present position of previously recognized stationary objects

In FIG. 6, SOp represents a previously recognized stationary group. The present position of each previously recognized stationary object is estimated based on the system's vehicle position, the system's vehicle speed, and the motion vector as well as the past position of this stationary object.

The estimated stationary object group SOp (marked by Δ in FIG. 6) are presently positioned outside the radar beam of the radar system 2. FIG. 6 does not show estimated stationary objects positioned in the radar beam of the radar system 2.

The present position of each previously recognized stationary object is estimated by using the following equations (12), (13) and (14).

$$\Delta\theta = \beta \times \Delta T \tag{12}$$

$$\Delta x\ [m] = R - R \times \cos(\Delta\theta) \tag{13}$$

$$\Delta y\ [m] = R \times \sin(\Delta\theta) \tag{14}$$

where $\beta$ represents a yaw rate of the system's vehicle VM which is calculated based on the steering sensor signal and the yaw rate sensor signal;

$\Delta T$ represents a time having passed;

$\Delta\theta$ [rad] represents a yaw rate change in the system's vehicle VM;

R represent a past position (i.e., distance from the system's vehicle VM) of the estimated stationary object;

$\Delta x$ represents an X-axis component of the motion of the estimated stationary object during the period of time $\Delta T$; and $\Delta y$ represents a Y-axis component of the motion of the estimated stationary object during the period of time $\Delta T$.

The estimated stationary object group SOp obtained through the above calculation includes the stationary objects positioned near the preceding vehicle VT as well as the stationary objects positioned near the system's vehicle VT.

(III) Selection of estimated stationary objects (near the preceding vehicle)

Among the estimated stationary object group SOp, a stationary object group sSOp is positioned within ±0.5 Lw with respect to the longitudinal center of the preceding vehicle VM.

Figure 7:
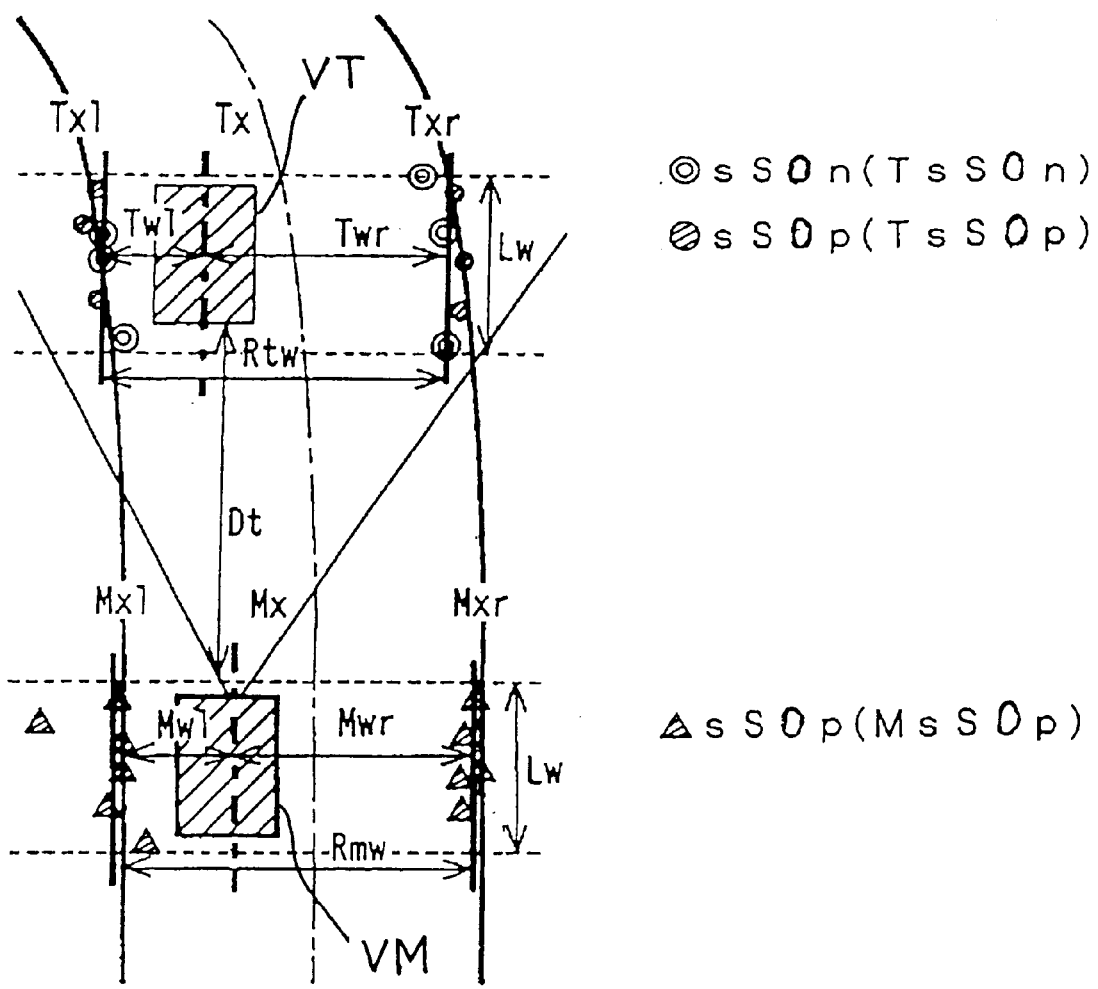
FIG. 7 is a view showing the positional data used in calculating clearances between each vehicle and respective road edges.

As shown in FIG. 7, both of the presently measurable stationary object group sSOn (TsSOn; marked by ○) and the previously recognized stationary object group sSOp (TsSOp; marked by ●) are positioned within ±0.5 Lw with respect to the longitudinal center of the preceding vehicle VT.

(IV) Grouping of stationary objects (near the preceding vehicle)

The presently measurable stationary object group sSOn and the previously recognized stationary object group sSOp are separated into a right group and a left group with respect to the preceding vehicle VT. In other words, the stationary objects are classified into two groups, one group located at a right edge of the traveling road and the other group located at a left edge of the traveling road.

(V) Lateral reference position in each group (near the preceding vehicle)

The lateral position of each stationary object is calculated in each of the right and left groups. An average of the obtained lateral positions in each group is referred to as a lateral reference position. FIG. 7 shows a line Txr representing a lateral reference position of the stationary objects belonging to the right group. Another line Txl represents a lateral reference position of the stationary objects belonging to the left group.

When there is any stationary object located far away from the lateral reference position (for example, by a predetermined lateral distance), such a noise-like stationary object is omitted. The lateral reference position (Txr or Txl) is renewed by averaging the remaining stationary objects in the same group.

An estimated curve of the traveling road can be calculated based on the steering sensor signal and the yaw rate sensor signal. When there is any stationary object located far away from this curve, such a stationary object is believed to be an object not located near the edge of the road. Thus, such a stationary object is omitted, and the lateral reference position (Txr or Txl) is renewed by averaging the remaining stationary objects in the same group.

If the total number of stationary objects belonging to the same group is smaller than a predetermined value, accuracy in the calculation of lateral reference position (Txr or Txl) will be worsened significantly. Thus, no lateral reference position is obtained.

(VI) Lateral reference position in each group (near the system's vehicle)

It is impossible to directly detect the present lateral position of previously recognized stationary objects positioned near the system's vehicle VM because a radar beam cannot detect them. Thus, the present lateral position of each stationary object positioned near the system's vehicle VM is estimated based on past data. FIG. 7 shows an estimated stationary object group sSOp (MsSOp; marked by ▲) positioned within ±Lw with respect to the longitudinal center of the system's vehicle VM. In this case, it is assumed that the system's vehicle VM has substantially the same longitudinal size (Lc) as that of the preceding vehicle VT.

The lateral position of each stationary object located near the system's vehicle VM is calculated in each of the right and left groups. An average of the obtained lateral positions in each group is referred to as a lateral reference position. FIG. 7 shows a line Mxr representing a lateral reference position of the stationary objects belonging to the right group. Another line Mxl represents a lateral reference position of the stationary objects belonging to the left group.

(VII) Calculation of traveling road width

A traveling road width Rtw corresponding to the preceding vehicle VT is obtained based on the lateral reference positions Txr and Txl as shown in the following equation (15).

$$Rtw = |Txr - Txl| \tag{15}$$

Similarly, a traveling road width Rmw corresponding to the system's vehicle VM is obtained based on the lateral reference positions Mxr and Mxl as shown in the following equation (16).

$$Rmw = |Mxr - Mxl| \tag{16}$$

(VIII) Same lane judgement

The same lane judgement is performed by using all of four lateral reference positions Txr, Txl, Mxr, and Mxl.

To minimize the influence of radar dispersion in the stationary object detection, past data of lateral reference positions are appropriately averaged for the use in the same lane judgement.

In FIG. 7, a line Tx represents a lateral center of the preceding vehicle VT and a line Mx represents a lateral center of the system's vehicle VM. The clearances from each vehicle to respective road edges are expressed by the following equations (17), (18), (19), and (20).

Left clearance of preceding vehicle; $Twl=|Txl-Tx|$ (17)

Right clearance of preceding vehicle; $Twr=|Txr-Tx|$ (18)

Left clearance of system's vehicle; $Mwl=|Mxl-Mx|$ (19)

Right clearance of system's vehicle; $Mwr=|Mxr-Mx|$ (20)

When the preceding vehicle VT and the system's vehicle VM are traveling on the same traffic lane in an ideal condition, the following relationship is established.

Twl=Mwl, Twr=Mwr

Based on the above relationship, it becomes possible to perform the same lane judgement. When the preceding vehicle VT and the system's vehicle VM are traveling on the same traffic lane, a same lane flag is set.

More specifically, the following condition (21) is continuously satisfied for a predetermined period of time when the preceding vehicle VT and the system's vehicle VM are traveling on the same traffic lane.

$|Twl-Mwl|+|Twr-Mwr| \leq \delta$ (predetermined value) (21)

In practical conditions, however, the radar beam may not always reach the stationary objects due to the presence of another vehicle traveling on the neighboring lane. Thus, in some occasions, it may be impossible to calculate all of the lateral reference positions Twl, Twr, Mwl and Mwr.

In such cases, the following processing is additionally performed.

① In case of failure in calculating right-side lateral reference positions Twr and Mwr, the same lane judgement is performed based on only left-side lateral reference positions Twl and Mwl.

② In case of failure in calculating left-side lateral reference positions Twl and Mwl, the same lane judgement is performed based on only right-side lateral reference positions Twr and Mwr.

③ In case of failure in calculating lateral reference positions Twl and Mwr, these values can be indirectly obtained from the road widths Rtw and Rmw, i.e., Twl=Rtw−Twr, and Mwr=Rmw−Mwl. Thus, the same lane judgement is feasible based on thus indirectly obtained values.

④ In case of failure in calculating lateral reference positions Twr and Mwl, these values can be indirectly obtained from the road widths Rtw and Rmw, i.e., Twr=Rtw−Twl, and Mwl=Rmw−Mwr. Thus, the same lane judgement is feasible based on thus indirectly obtained values.

⑤ In case of failure in calculating three of lateral reference positions Twl, Twr, Mwl and Mwr, the same lane judgement is feasible when the information of the preceding vehicle VT (i.e., Twr or Twl) is correctly recognized. The estimated curve of the traveling road can be corrected by using the information of the preceding vehicle VT.

(IX) Identification of true preceding vehicle

There may be a plurality of preceding vehicles having been set the same lane flag in the above procedure of (VIII). Thus, the closest one among these preceding vehicles is identified as a true preceding vehicle. A preceding vehicle flag is set for the selected vehicle.

Details of Preceding Vehicle Selecting Processing

Hereinafter, the preceding vehicle selecting processing performed in step 230 will be explained in more detail with reference to the flowchart shown in FIG. 8.

Step 500 obtains the positional information of the presently measurable stationary object group SOn through the stationary object judgement using the radar system 2 and memorized.

Then, step 510 calculates the present position of the estimated stationary object group SOp based on the data of the previously recognized stationary object group by using the equations (12) to (14). The estimated stationary object group SOp includes both the estimated stationary object group TsSOp positioned within ±0.5 Lw with respect to the longitudinal center of the preceding vehicle VT and the estimated stationary object group MsSOp positioned within ±0.5 Lw with respect to the longitudinal center of the system's vehicle VM.

Next, step 520 selects the estimated stationary object group MsSOp positioned within ±0.5 Lw with respect to the longitudinal center of the system's vehicle VM from the estimated stationary object group SOp.

Next, step 530 separates the estimated stationary object group MsSOp into right and left groups.

Next, step 540 calculates the lateral reference positions Mxr and Mxl located at the right and left sides of the system's vehicle VM based on the data of each separated group of estimated stationary object group MsSOp.

Next, step 550 selects the presently measurable stationary object group TsSOn positioned within ±0.5 Lw with respect to the longitudinal center of the preceding vehicle VT from the presently measurable stationary object group SOn.

Next, step 560 selects the estimated stationary object group TsSOp positioned within ±0.5 Lw with respect to the longitudinal center of the preceding vehicle VT from the estimated stationary object group SOp obtained in the step 510.

Next, step 570 separates both the presently measurable stationary object group TsSOn and the estimated stationary object group TsSOp into right and left groups.

Next, step 580 calculates the lateral reference positions Txr and Txl at the right and left sides of the preceding vehicle VT based on the data of each separated group of presently measurable stationary object group TsSOn as well as each separated group of estimated stationary object group MsSOp.

Next, step 590 calculates the road widths Rtw and Rmw by using the equations (15) and (16).

Next, step 600 performs the same lane judgement for each of the preceding vehicles. As explained above, the clearances from each vehicle to respective road edges are expressed by the equations (17), (18), (19), and (20). When the condition (21) is continuously satisfied for a predetermined period of time, it is recognized that the preceding vehicle VT and the system's vehicle VM are traveling on the same traffic lane.

Next, step 610 makes a judgement as to whether the same lane judgement is finished for all of the preceding vehicles. When the judgement result is YES in the step 610, the control flow proceeds to step 620. When the judgement result is NO in the step 610, the control flow returns to step 550 to repeat the processing of steps 550 to 610 for a unprocessed preceding vehicle.

The step 620 assigns the preceding vehicle flag to the preceding vehicle which is closest to the system's vehicle among the preceding vehicles having been set the same lane flag. The preceding vehicle having been set this flag is recognized as a true target object in the automatic follow-up or distance control between two traveling vehicles.

Effects of Invention

① The above-described embodiment uses not only the position data of the presently measurable stationary object group but also the estimated position data of the previously recognized stationary object group. This makes it possible to accurately detect the positional relationship between the preceding vehicle and the system's vehicle.

For example, it is difficult for the radar disposed on the front end of a vehicle to detect the stationary objects positioned at right and left sides of the vehicle because of a limited angle of radar beam.

Figure 9A:
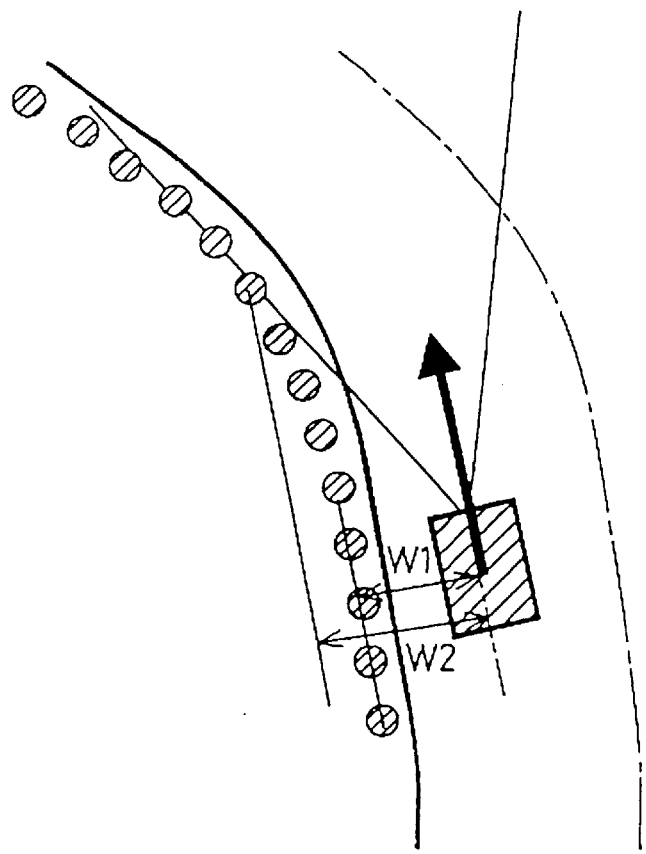
FIG. 9A is a view showing the effect of present invention in calculating the clearances between the vehicle and curved road edges.
Figure 9B:
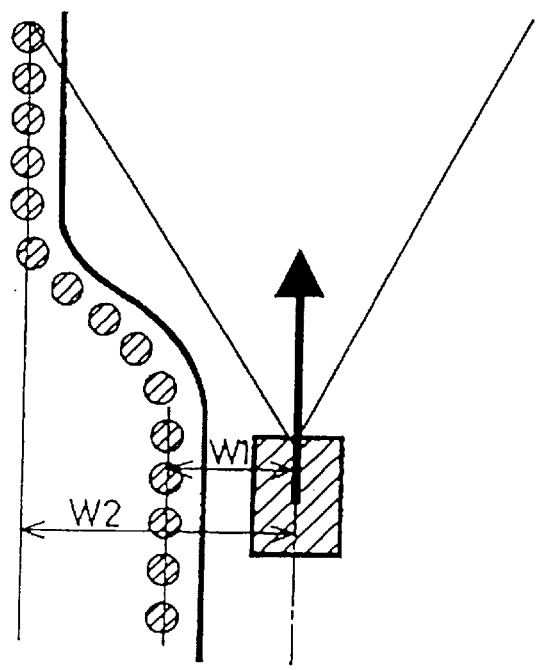
FIG. 9B is a view showing the effect of present invention in calculating the clearances between the vehicle and irregular road edges.

FIG. 9A shows a distance W2 which is an erroneously recognized clearance between the system's vehicle and the road edge when the system's vehicle travels on a curved road. Such an error is caused by using only the position data of the presently measurable stationary object group. A distance W1 is a correctly recognized clearance between the system's vehicle and the road edge. FIG. 9B shows a similar situation occurring when the system's vehicle passes a change point of road width.

The above-described embodiment makes it possible to accurately detect the distance W1 by using the estimated position data of the previously recognized stationary object group in addition to the position data of the presently measurable stationary object group.

Thus, it becomes possible to accurately perform the same lane judgement based on accurately recognized distance data. In other words, this embodiment makes it possible to accurately detect the preceding vehicle.

② Furthermore, the above-described embodiment uses the position data of both (or at least one of) right and left stationary groups separated with respect to a traveling vehicle. This makes it easy to accurately detect the clearance between the traveling vehicle and the road edges, even when no reflectors are provided along the edges of the road. Thus, the same lane judgement is accurately performed.

③ Furthermore, using the position data of the stationary objects positioned adjacent to the preceding vehicle and the position data of the stationary objects positioned adjacent to the system's vehicle is effective because the calculation or computation volume can be significantly reduced in the same lane judgement. If the road configuration and conditions are calculated based on the data obtained from the reflections, it will take more time to complete the same lane judgement.

④ Moreover, using the position data of both (or at least one of) right and left stationary groups separated with respect to a traveling vehicle is advantageous in that the required radar performance is not so high. Thus, the system cost can be reduced.

⑤ In addition, when the radar beam is blocked by other vehicles, the above-described embodiment accurately estimates the position of undetected stationary objects by using the previously recognized position data as well as the angular velocity of the system's vehicle (obtainable from the yaw rate sensor). In other words, the above-described embodiment provides a backup system effective in case of the failure in the detection of stationary objects.

⑥ Furthermore, when the obtained data amount of the stationary objects is insufficient, the above-described embodiment corrects an estimated traveling road obtainable from the steering sensor and the yaw rate sensor, thereby assuring the accuracy in the same lane judgement. For example, the estimated traveling road (or estimated traffic lane) is obtained by using the steering sensor data. This embodiment makes it possible to further correct the estimated traveling road with reference to the clearances between each vehicle and the road edges.

Figure 10:
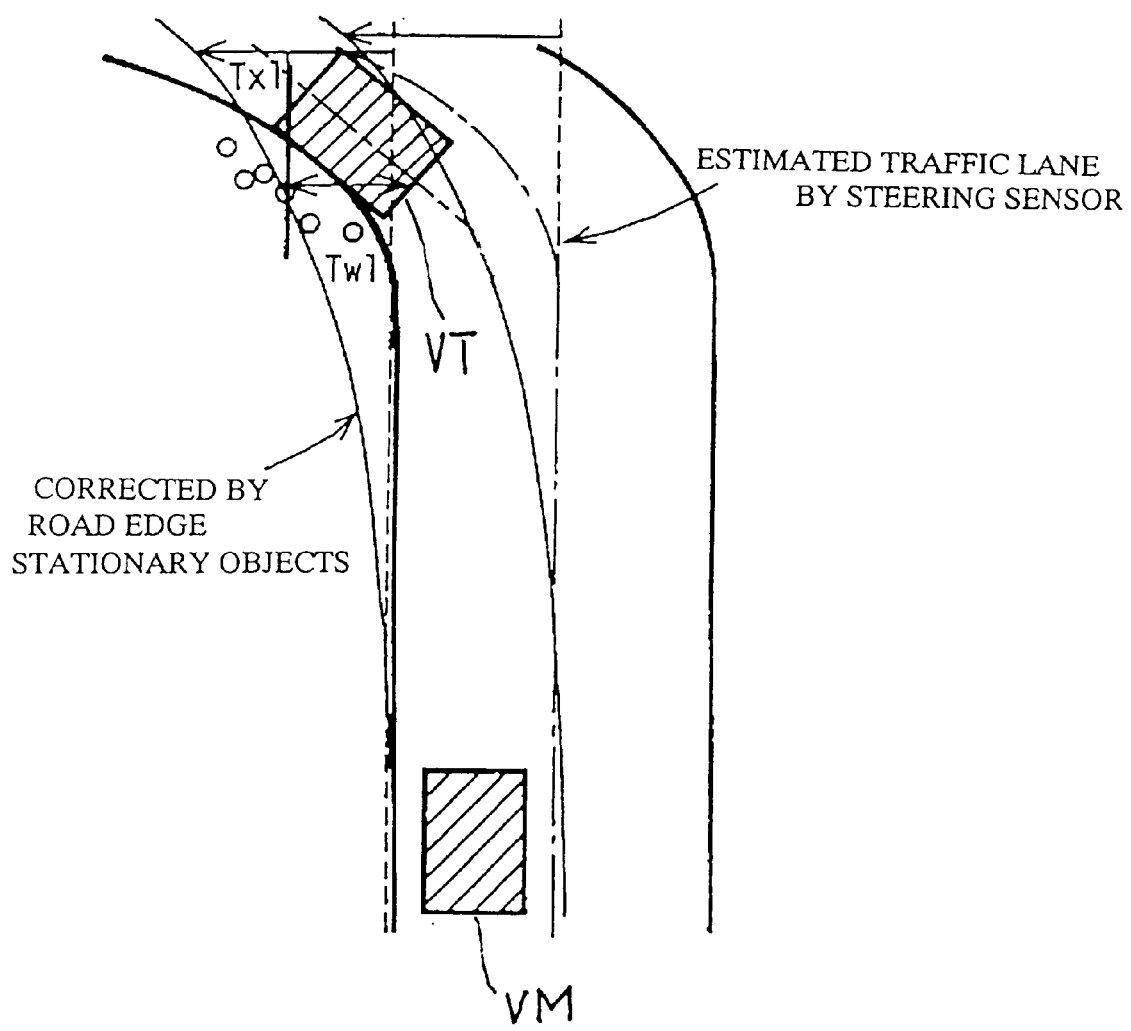
FIG. 10 is a view showing the effect of present invention in estimating the traffic lane.

FIG. 10 shows a straight lane (indicated by dotted lines) estimated by only using the steering sensor data. An estimated lane (indicated by solid lines) obtained according to the above-described embodiment is similar to the actual traffic lane (indicated by alternate long and short dash lines), because the above-described embodiment uses the clearances between the preceding vehicle and the road edges.

Various Modifications

The present invention is not limited to the above-described embodiment, and therefore can be modified in various ways.

(1) The present invention is also applied to a software device or system. The present invention encompasses a recording medium storing a software program or a plurality of programs relating to the controls performed in the above-described radar system or road circumstance detecting system.

Figure 5:
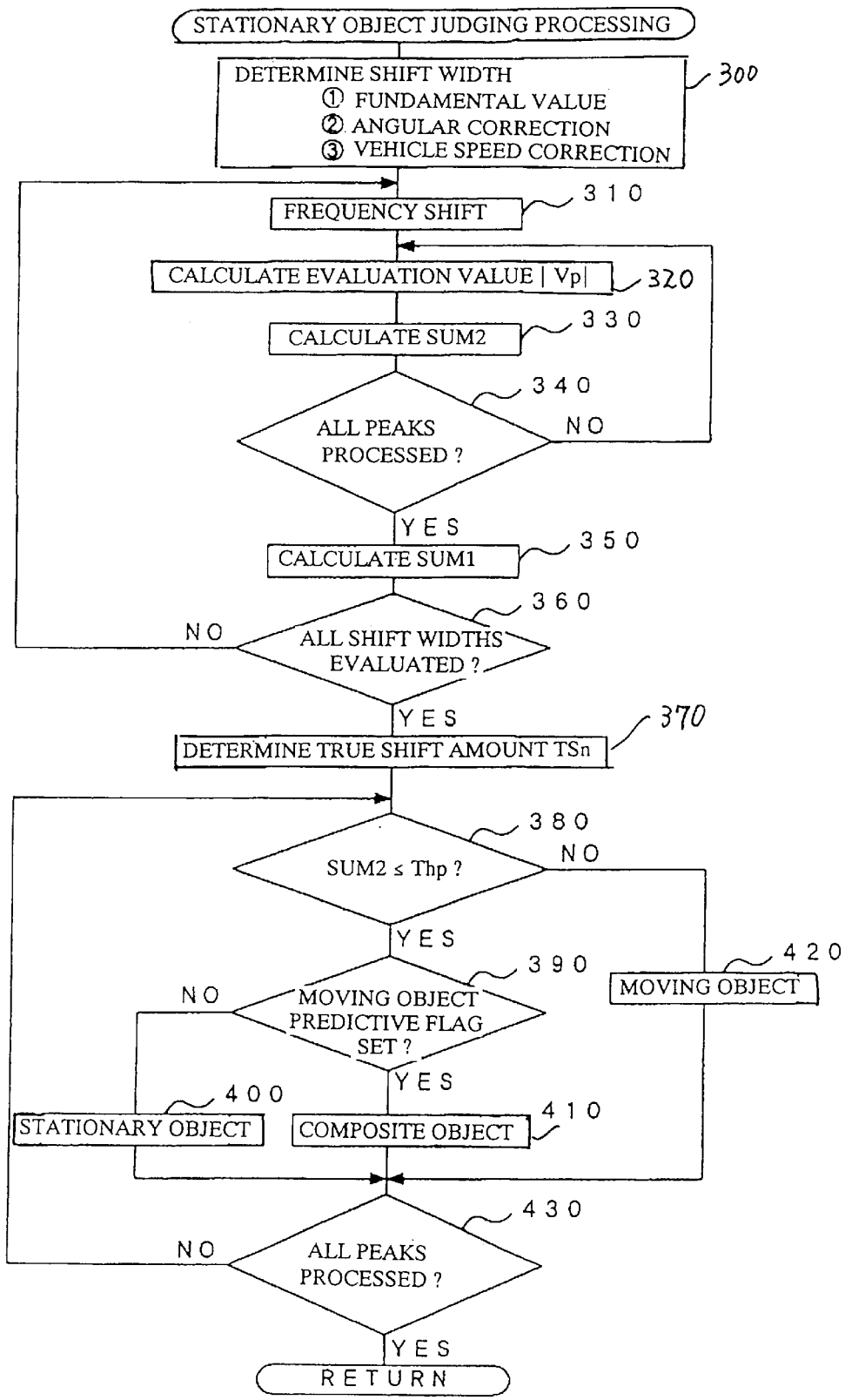
FIG. 5 is a flowchart explaining details of stationary object detecting processing in accordance with the preferred embodiment of the present invention.
Figure 8:
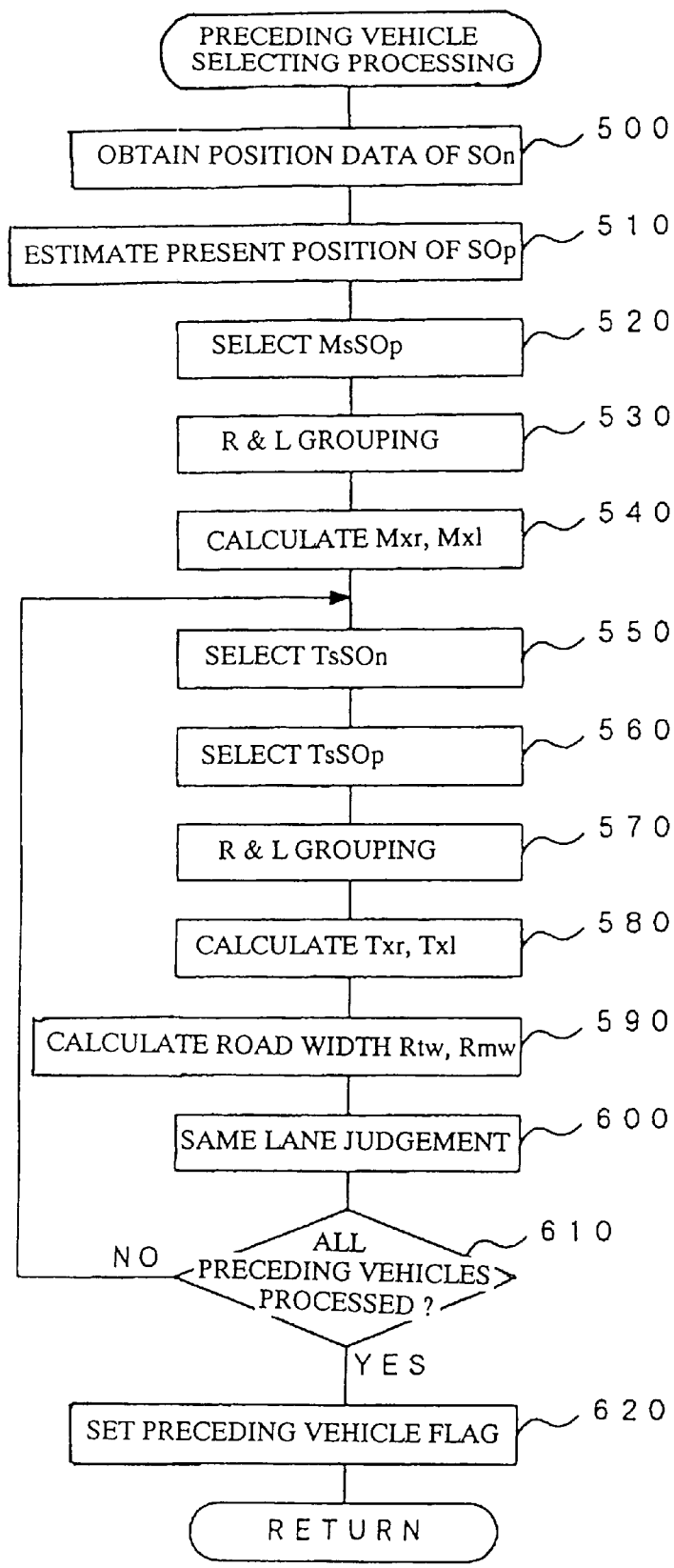
FIG. 8 is a flowchart explaining details of preceding vehicle selecting processing in accordance with the preferred embodiment of the present invention.

For example, the processing procedures shown in FIGS. 4, 5 and 8 can be stored as a control program in a recording medium, such as a memory (ROM, back-up RAM) or a built-in hard disk drive, which is pre-installable in the microcomputer. However, it is possible to store the control program in a portable recording medium, such as a floppy disk, a MO (magneto-optical) disk, a CD-ROM, an external hard disk drive and a DVD (digital versatile disk), so that the control program can be arbitrarily loaded from such a recording medium to the microcomputer.

(2) If it is necessary to further reduce the calculation or computation time in the detection of the lateral reference position, it may be possible to omit either the position data of the presently measurable stationary object group or the position data of the previously recognized stationary object group.

(3) The stationary object judgement is not limited to the above-described method, and therefore other methods can be used. For example, when the target object approaches at the same speed as the traveling speed of the system's vehicle, this object can be identified as a stationary object.

(4) The radar system used in the present invention is not limited to the FMCW radar system. For example, a radio wave type radar is also useable.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A road circumstance detecting apparatus comprising:
   a radar system mounted on a traveling vehicle for emitting radar wave toward a presently measurable stationary object group existing in front of said radar system and for measuring the momentary position of said presently measurable stationary object group based on reflection of said radar wave;
   memory means for storing measured position data of said presently measurable stationary object group existing in front of said radar system;

estimating means for estimating the present position of a previously recognized stationary object group based on the measured position data of said previously recognized stationary object group stored in said memory means and the movement of said traveling vehicle during a past time; and detecting means for detecting a clearance between said traveling vehicle and a stationary object group positioned adjacent to said traveling vehicle along a road edge based on the present position data of said previously recognized stationary object group estimated by said estimating means.

2. The road circumstance detecting apparatus in accordance with claim 1, wherein said clearance detection is performed by using the present position data of a previously recognized stationary object group existing within a predetermined region with respect to said traveling vehicle.

3. The road circumstance detecting apparatus in accordance with claim 2, wherein said predetermined region has a longitudinal size longer than a longitudinal length of said traveling vehicle.

4. The road circumstance detecting apparatus in accordance with claim 3, wherein the longitudinal size of said predetermined region is substantially equal to two times the longitudinal length of said traveling vehicle.

5. The road circumstance detecting apparatus in accordance with claim 1, wherein said stationary object group positioned adjacent to said traveling vehicle along the road edge is separated into right and left groups to detect a clearance between said traveling vehicle and each of said right and left groups.

6. A road circumstance detecting apparatus comprising:

a radar system mounted on a traveling vehicle for emitting radar wave toward a presently measurable stationary object group existing in front of said radar system and for measuring the momentary position of said presently measurable stationary object group based on reflection of said radar wave;

memory means for storing measured position data of said presently measurable stationary object group existing in front of said radar system;

estimating means for estimating the present position of a previously recognized stationary object group based on the measured position data of said previously recognized stationary object group stored in said memory means and the movement of said traveling vehicle during a past time; and detecting means for detecting a clearance between a preceding vehicle and a stationary object group positioned adjacent to said preceding vehicle along a road edge based on the present position data of said previously recognized stationary object group estimated by said estimating means and position data of said preceding vehicle.

7. The road circumstance detecting apparatus in accordance with claim 6, wherein first selecting means is provided for selecting a previously recognized stationary object group existing within a predetermined region with respect to said preceding vehicle, and said clearance detection is performed by using the present position data of said previously recognized stationary object group selected by said first selecting means.

8. The road circumstance detecting apparatus in accordance with claim 7, wherein said predetermined region has a longitudinal size longer than a longitudinal length of said preceding vehicle.

9. The road circumstance detecting apparatus in accordance with claim 8, wherein the longitudinal size of said predetermined region is substantially equal to two times the longitudinal length of said preceding vehicle.

10. The road circumstance detecting apparatus in accordance with claim 7, wherein second selecting means is provided for selecting a presently measurable stationary object group existing within a predetermined region with respect to said preceding vehicle, and said clearance detection is performed by using the position data of said presently measurable stationary object group selected by said second selecting means.

11. The road circumstance detecting apparatus in accordance with claim 6, wherein said stationary object group positioned adjacent to said preceding vehicle along the road edge is separated into right and left groups to detect a clearance between said preceding vehicle and each of said right and left groups.

12. The road circumstance detecting apparatus in accordance with claim 6, wherein an estimated traffic lane of a traveling road is corrected based on the clearance obtained by said detecting means.

13. A road circumstance detecting apparatus comprising:

a radar system mounted on a traveling vehicle for emitting radar wave toward a presently measurable stationary object group existing in front of said radar system and for measuring the momentary position of said presently measurable stationary object group based on reflection of said radar wave;

memory means for storing measured position data of said presently measurable stationary object group existing in front of said radar system;

estimating means for estimating the present position of a previously recognized stationary object group based on the measured position data of said previously recognized stationary object group stored in said memory means and the movement of said traveling vehicle during a past time;

first detecting means for detecting a clearance between said traveling vehicle and a stationary object group positioned adjacent to said traveling vehicle along a road edge based on the present position data of said previously recognized stationary object group estimated by said estimating means;

second detecting means for detecting a clearance between a preceding vehicle and a stationary object group positioned adjacent to said preceding vehicle along a road edge based on the present position data of said previously recognized stationary object group estimated by said estimating means and position data of said preceding vehicle; and same lane judging means for judging whether said traveling vehicle and said preceding vehicle are traveling on a same traffic lane based on at least one of the detected clearances detected by said first detecting means and said second detecting means.

14. The road circumstance detecting apparatus in accordance with claim 13, wherein the clearance between said traveling vehicle and the stationary object group positioned adjacent to said traveling vehicle is compared with the clearance between said preceding vehicle and the stationary object group positioned adjacent to said preceding vehicle, and it is recognized that said preceding vehicle and said traveling vehicle are traveling on the same traffic lane when a difference between said compared clearances is smaller than a predetermined value.

15. The road circumstance detecting apparatus in accordance with any one of claims 1, 6 and 13, wherein said radar system is a FMCW (frequency modulated continuous wave) type radar system comprises:

transmitting means for transmitting a radar wave carrying a transmission signal having a periodically increasing and decreasing frequency with a predetermined modulation width;

receiving means for receiving a radar wave reflected from a target object to generate a reception signal, said reception signal being mixed with said transmission signal to generate a beat signal;

spectrum producing means for producing an ascending spectrum from an ascending beat signal obtained during an ascending modulation where the frequency of said transmission signal increases and also for producing a descending spectrum from a descending beat signal obtained during a descending modulation where the frequency of said transmission signal decreases; and detecting means for shifting a peak of at least one of said ascending spectrum and said descending spectrum by a predetermined frequency shift amount to compare corresponding peaks of said ascending spectrum and said descending spectrum, thereby detecting a shift condition of said target object.

16. The road circumstance detecting apparatus in accordance with claim 15, further comprising:

frequency shift amount determining means for setting a plurality of frequency shift amounts based on a traveling speed of said traveling vehicle;

evaluation means for evaluating a spectrum matching degree for each of said ascending spectrum and said descending spectrum corresponding to each of said frequency shift amounts;

identifying means for identifying an optimum frequency shift amount having the highest degree in spectrum matching; and stationary object judging means for judging whether said target object is a stationary object based on the ascending spectrum and the descending spectrum of said optimum frequency shift amount.

17. A method for detecting road circumstances comprising:

a step of obtaining the momentary position of a presently measurable stationary object group existing in front of a radar system mounted on a traveling vehicle;

a step of estimating the present position of a previously recognized stationary object group based on the measured position data of said previously recognized stationary object group and the movement of said traveling vehicle during a past time; and a step of detecting a clearance between said traveling vehicle and a stationary object group positioned adjacent to said traveling vehicle along a road edge based on the present position data of said previously recognized stationary object group.

18. The road circumstance detecting method in accordance with claim 17, further comprising a step of selecting a previously recognized stationary object group existing within a predetermined region with respect to said traveling vehicle, for performing said clearance detection by using the present position data of said previously recognized stationary object group.

19. The road circumstance detecting method in accordance with claim 17, further comprising a step of separating said stationary object group positioned adjacent to said traveling vehicle along the road edge into right and left groups to detect a clearance between said traveling vehicle and each of said right group and said left group.

20. A method for detecting road circumstances comprising:

a step of obtaining the momentary position of a presently measurable stationary object group existing in front of a radar system mounted on a traveling vehicle;

a step of estimating the present position of a previously recognized stationary object group based on the measured position data of said previously recognized stationary object group and the movement of said traveling vehicle during a past time; and a step of detecting a clearance between a preceding vehicle and a stationary object group positioned adjacent to said preceding vehicle along a road edge based on the present position data of said previously recognized stationary object group and position data of said preceding vehicle.

21. The road circumstance detecting method in accordance with claim 20, further comprising a step of selecting a previously recognized stationary object group existing within a predetermined region with respect to said preceding vehicle, for performing said clearance detection by using the present position data of said previously recognized stationary object group.

22. The road circumstance detecting method in accordance with claim 20, further comprising a step of selecting a presently measurable stationary object group existing within a predetermined region with respect to said preceding vehicle, for performing said clearance detection by using the position data of said presently measurable stationary object group.

23. The road circumstance detecting method in accordance with claim 20, further comprising a step of separating said stationary object group positioned adjacent to said preceding vehicle along the road edge into right and left groups to detect a clearance between said preceding vehicle and said right group and a clearance between said preceding vehicle and said left group.

24. The road circumstance detecting method in accordance with claim 20, further comprising a step of correcting an estimated traffic lane of a traveling road based on the obtained clearance.

25. A method for detecting road circumstances comprising:

a step of obtaining the momentary position of a presently measurable stationary object group existing in front of a radar system mounted on a traveling vehicle;

a step of estimating the present position of a previously recognized stationary object group based on the measured position data of said previously recognized stationary object group and the movement of said traveling vehicle during a past time;

a step of detecting a clearance between said traveling vehicle and a stationary object group positioned adjacent to said traveling vehicle along a road edge based on the present position data of said previously recognized stationary object group;

a step of detecting a clearance between a preceding vehicle and a stationary object group positioned adjacent to said preceding vehicle along a road edge based on the present position data of said previously recognized stationary object group and position data of said preceding vehicle; and a step of judging whether said traveling vehicle and said preceding vehicle are traveling on a same traffic lane based on at least one of the detected clearances.

26. The road circumstance detecting method in accordance with claim 25, wherein said judgement whether said traveling vehicle and said preceding vehicle are traveling on a same traffic lane comprises the steps of:

comparing the clearance between said traveling vehicle and the stationary object group positioned adjacent to said traveling vehicle with the clearance between said preceding vehicle and the stationary object group positioned adjacent to said preceding vehicle, and recognizing that said preceding vehicle and said traveling vehicle are traveling on the same traffic lane when a difference between said compared clearances is smaller than a predetermined value.

27. A recording medium storing a software program installable in a computer system for detecting road circumstances, wherein said software program comprises the processing of:

obtaining the momentary position of a presently measurable stationary object group existing in front of a radar system mounted on a traveling vehicle;

estimating the present position of a previously recognized stationary object group based on the measured position data of said previously recognized stationary object group and the movement of said traveling vehicle during a past time; and detecting a clearance between said traveling vehicle and a stationary object group positioned adjacent to said traveling vehicle along a road edge based on the present position data of said previously recognized stationary object group.

28. The recording medium in accordance with claim 27, wherein said software program further comprises the processing of selecting a previously recognized stationary object group existing within a predetermined region with respect to said traveling vehicle, for performing said clearance detection by using the present position data of said previously recognized stationary object group.

29. The recording medium in accordance with claim 27, wherein said software program further comprises the processing of separating said stationary object group positioned adjacent to said traveling vehicle along the road edge into right and left groups to detect a clearance between said traveling vehicle and said right group and a clearance between said traveling vehicle and said left group.

30. A recording medium storing a software program installable in a computer system for detecting road circumstances, wherein said software program comprises the processing of:

obtaining the momentary position of a presently measurable stationary object group existing in front of a radar system mounted on a traveling vehicle;

estimating the present position of a previously recognized stationary object group based on the measured position data of said previously recognized stationary object group and the movement of said traveling vehicle during a past time; and detecting a clearance between a preceding vehicle and a stationary object group positioned adjacent to said preceding vehicle along a road edge based on the present position data of said previously recognized stationary object group and position data of said preceding vehicle.

31. The recording medium in accordance with claim 30, wherein said software program further comprises the processing of selecting a previously recognized stationary object group existing within a predetermined region with respect to said preceding vehicle, for performing said clearance detection by using the present position data of said previously recognized stationary object group.

32. The recording medium in accordance with claim 30, wherein said software program further comprises the processing of selecting a presently measurable stationary object group existing within a predetermined region with respect to said preceding vehicle, for performing said clearance detection by using the position data of said presently measurable stationary object group.

33. The recording medium in accordance with claim 30, wherein said software program further comprises the processing of separating said stationary object group positioned adjacent to said preceding vehicle along the road edge into right and left groups to detect a clearance between said preceding vehicle and said right group and a clearance between said preceding vehicle and said left group.

34. The recording medium in accordance with claim 30, wherein said software program further comprises the processing of correcting an estimated traffic lane of a traveling road based on the obtained clearance.

35. A recording medium storing a software program installable in a computer system for detecting road circumstances, wherein said software program comprises the processing of:

obtaining the momentary position of a presently measurable stationary object group existing in front of a radar system mounted on a traveling vehicle;

estimating the present position of a previously recognized stationary object group based on the measured position data of said previously recognized stationary object group and the movement of said traveling vehicle during a past time;

detecting a clearance between said traveling vehicle and a stationary object group positioned adjacent to said traveling vehicle along a road edge based on the present position data of said previously recognized stationary object group;

detecting a clearance between a preceding vehicle and a stationary object group positioned adjacent to said preceding vehicle along a road edge based on the present position data of said previously recognized stationary object group and position data of said preceding vehicle; and judging whether said traveling vehicle and said preceding vehicle are traveling on a same traffic lane based on at least one of the detected clearances.

36. The recording medium in accordance with claim 35, wherein said judgement whether said traveling vehicle and said preceding vehicle are traveling on a same traffic lane comprises the processing of:

comparing the clearance between said traveling vehicle and the stationary object group positioned adjacent to said traveling vehicle with the clearance between said preceding vehicle and the stationary object group positioned adjacent to said preceding vehicle, and recognizing that said preceding vehicle and said traveling vehicle are traveling on the same traffic lane when a difference between said compared clearances is smaller than a predetermined value.

* * * * *